United States Patent [19]

Karner et al.

[11] Patent Number: 5,673,877
[45] Date of Patent: Oct. 7, 1997

[54] EXHAUST PIPE HANGER ASSEMBLY

[75] Inventors: Joseph Richard Karner, Sterling Heights; Stephen Benjamin Sherrick, Waterford; Alexander Christopher Winter, Plymouth; Gregory Lee Zubal, Davisburg; Katherine Lee Tachick, Sterling Heights, all of Mich.; Jack William Berletch, Apache Junction, Ariz.

[73] Assignee: General Motors Corporation, Detroit, Mich.

[21] Appl. No.: 441,846

[22] Filed: May 16, 1995

[51] Int. Cl.$^6$ ............................... F16L 3/00; F16L 3/16
[52] U.S. Cl. ............................ 248/58; 411/383; 411/399
[58] Field of Search ............................ 248/60, 71, 73, 248/216.4, 216.7; 411/383, 384, 399, 546, 401

[56] References Cited

U.S. PATENT DOCUMENTS

| | | | |
|---|---|---|---|
| 519,411 | 5/1894 | North et al. | 411/399 X |
| 1,627,912 | 5/1927 | Lomason | 411/399 |
| 2,202,811 | 6/1940 | Carney et al. | 248/216.4 X |
| 2,912,198 | 11/1959 | Feil, Jr. | 248/60 X |
| 3,117,801 | 1/1964 | Dionne | 248/60 X |
| 4,116,411 | 9/1978 | Masuda . | |
| 4,550,795 | 11/1985 | Teshima . | |
| 4,667,920 | 5/1987 | Kleineberg et al. . | |
| 4,676,332 | 6/1987 | Saito . | |
| 4,688,829 | 8/1987 | Shioda et al. | 248/73 X |
| 4,714,218 | 12/1987 | Hungerford, Jr. . | |
| 4,824,056 | 4/1989 | Wuebker et al. . | |
| 5,209,621 | 5/1993 | Burbidge | 411/546 X |
| 5,228,247 | 7/1993 | Dressler | 411/546 X |
| 5,303,896 | 4/1994 | Sterka | 248/634 X |
| 5,398,907 | 3/1995 | Kelchner | 248/63 X |

FOREIGN PATENT DOCUMENTS 0039870  11/1981  France ...................... 248/60

*Primary Examiner*—Leslie A. Braun
*Assistant Examiner*—Long Dinh Phan
*Attorney, Agent, or Firm*—Kathryn A. Marra; Howard N. Conkey

[57] ABSTRACT

An exhaust pipe hanger assembly is provided in a vehicle having a rigid structural member. The exhaust pipe hanger assembly includes a continuously linearly extending rigid rod bracket. The rod bracket has a first portion extending through and securely captured within the rigid structural member and a second portion linearly extending from the first portion and extending outwardly from the structural member. The exhaust pipe is suspended from the second portion of the rigid rod bracket. The rigid rod bracket has sufficiently high stiffness and resonant vibrational frequencies such that transmission of exhaust pipe vibration into the vehicle is reduced.

16 Claims, 3 Drawing Sheets

EXHAUST PIPE HANGER ASSEMBLY

This invention relates to an exhaust pipe hanger assembly for suspending an exhaust pipe in a vehicle.

BACKGROUND OF THE INVENTION

It is well known in motor vehicles to have an exhaust pipe flexibly suspended from a vehicle by an exhaust pipe hanger assembly. A typical exhaust pipe hanger assembly is designed using flexible elements having low stiffness to support the exhaust pipe in combination with fairly stiff elements having higher resonant frequencies for attaching the exhaust pipe hanger assembly to the vehicle. Together, these normally impede the transmission from the exhaust pipe to the floor of the passenger compartment of structural noise and vibration with frequencies in the range of those produced by the engine and driveline. In addition, the exhaust hanger assembly also prevents the transmission of heat from the exhaust pipe to the vehicle.

A typical prior art exhaust pipe hanger assembly for flexibly suspending an exhaust pipe in a vehicle includes a combination of one or more bent rod members, flexible elements, and clamp or strap members, all of which extend downwardly from the vehicle body. The stiffer component for attachment to the vehicle is typically fastened, such as by bolts, onto the outside of supportive vehicle structure, such as the vehicle frame. For example, one common arrangement includes such a first bent rod member having a bent end portion and bolted to the outside of the frame of the vehicle, a second bent rod member having a bent end portion and mounted to the exhaust pipe, and a flexible element having two holes, each receiving one of the two bent end portions of the first and second rod members. These typical prior art exhaust hangers are designed to flexibly suspend the exhaust pipe and to impede the transmission of unpleasant low frequency vibrations to the vehicle occupant by the stiffer vehicle attachment component.

However, in some vehicles, the typical exhaust hanger assembly having bent rods bolted to the outside of the vehicle structure is not sufficiently stiff at the vehicle attachment point to attenuate sensible structural noise and vibration, due to the presence of resonant frequencies within the hanger assembly, or due to insufficient difference between the stiffness of the hanger structure and the flexible elements.

SUMMARY OF THE INVENTION

This invention provides an improved exhaust pipe hanger assembly which provides for ease of manufacture and assembly and significantly increases the stiffness and resonant vibrational frequencies at the location of attachment to the vehicle structure over exhaust pipe hanger assemblies of the prior art such that transmission of noise and vibration into the vehicle which is sensible by a vehicle occupant is greatly reduced.

These advantages are accomplished by providing an exhaust pipe hanger assembly in a vehicle having a rigid structural member. The exhaust pipe hanger assembly includes a continuously linearly extending rigid rod bracket. The rod bracket has a first portion extending through and securely captured within the rigid structural member such that movement of the rod bracket relative the structural member is prevented. The rod bracket includes a second portion linearly extending from the first portion and extending outwardly from the structural member. The exhaust pipe is suspended from the second portion of the rigid rod bracket. The rigid rod bracket has sufficiently high stiffness and resonant vibrational frequencies such that transmission of exhaust pipe vibration into the vehicle is reduced.

In accordance with another aspect of the invention, a rigid support member is positioned substantially within and extends through the rigid structural member of the vehicle. The support member is rigidly secured to the structural member to prevent movement of the support member relative the structural member. The support member has an inner passageway extending therethrough and the first portion of the rigid rod bracket is inserted in the passageway of the support member and securely captured therein. The support member which is rigidly mounted to the structural member further increases the stiffness of the rod bracket to reduce the transmission of vibration into the vehicle.

BRIEF DESCRIPTION OF THE DRAWINGS

An embodiment of the present invention is described below, by way of example only, with reference to the accompanying drawings in which.

DESCRIPTION OF THE PREFERRED EMBODIMENT

Figure 1:
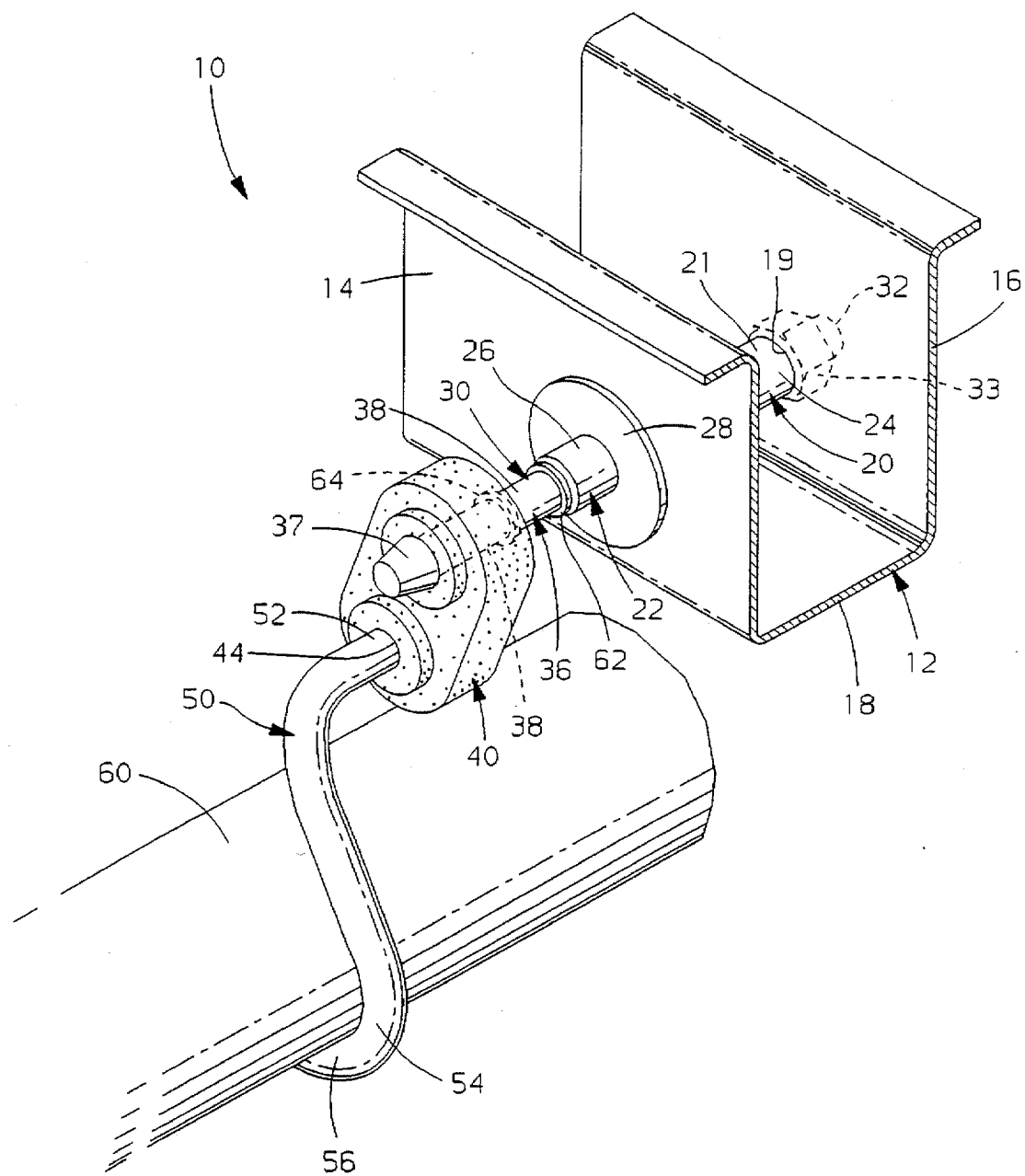
FIG. 1 is an assembled perspective view of an exhaust pipe hanger assembly according to the present invention.
Figure 2:
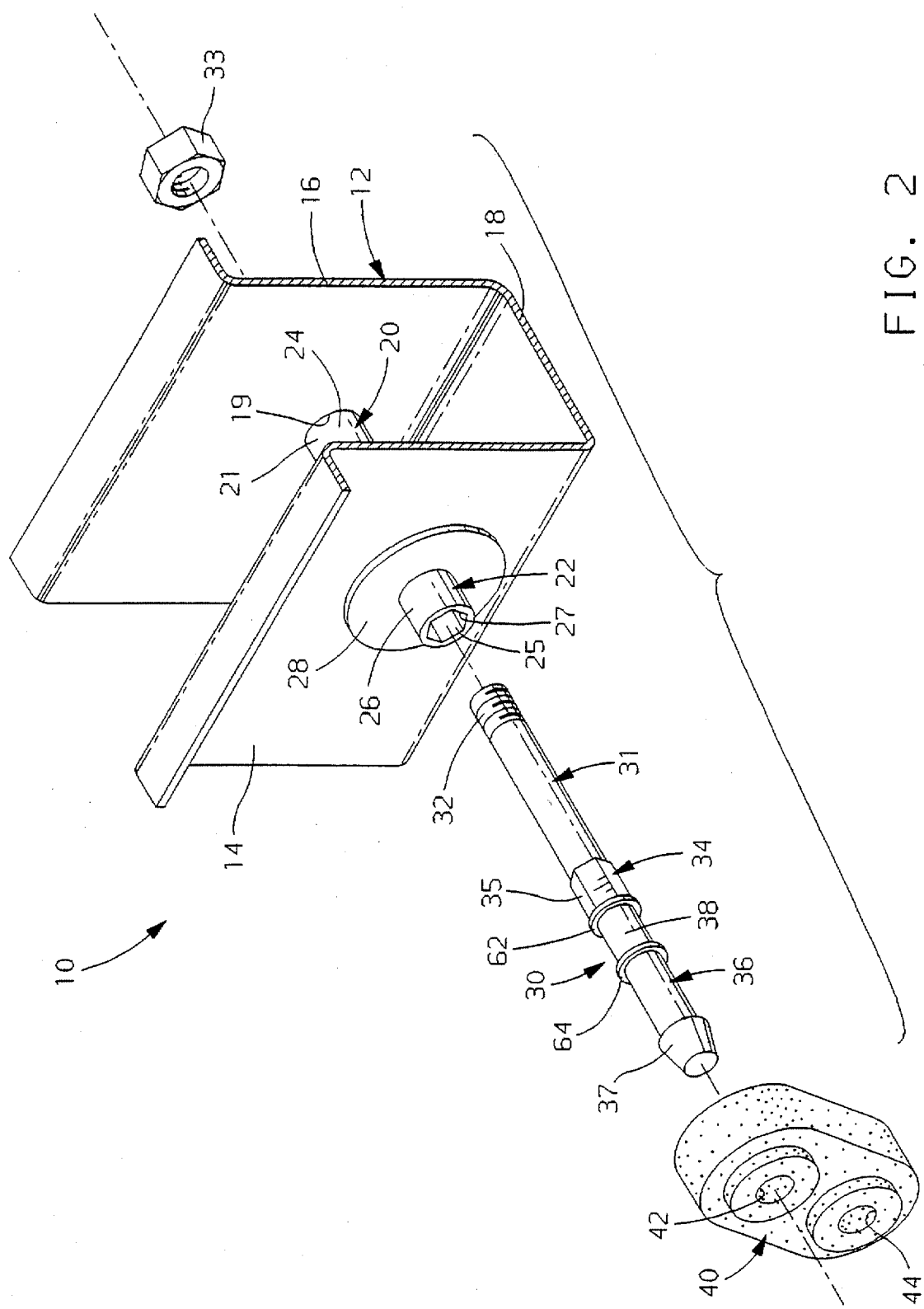
FIG. 2 is an exploded perspective view of a portion of the exhaust pipe hanger assembly of FIG. 1.

Referring to FIGS. 1 and 2, an exhaust pipe hanger assembly 10 in a vehicle includes a rigid structural member 12, a rigid tubular support member 20, a rigid rod bracket 30, a flexible element 40, a rigid bent rod hanger member 50, and an exhaust pipe 60 connected to the engine (not shown). The heat, noise and vibration from the engine are transmitted along the exhaust pipe 60.

An underside of a vehicle body (not shown) includes the rigid structural member 12 preferably being a metallic channel-shaped vehicle frame rail member which is suitably closed across the top by a vehicle floor pan or other metal panel (not shown). The structural member 12 includes a first side 14 and a spaced apart opposing second side 16, each preferably generally vertically downwardly extending beneath the vehicle. The first and second sides 14, 16 are connected at their lower edges by a generally horizontally extending bottom side 18. Each of the sides 14, 16 is provided with an aperture 19 aligned and sized for receiving the support member 20 and rod bracket 30 therethrough, as described further hereinafter.

The rigid tubular support member 20 is preferably formed from a metallic material. The support member 20 is preferably axially elongated and has an axial length slightly longer than a distance between the first and second sides 14, 16 of the structural member 12. The support member 20 preferably has a tubular cross-section having a circular outer diameter 21 sized for being closely received within the apertures 19 of the sides 14, 16 of the structural member 12.

The support member 20 includes an inner axially extending passageway 25 entirely therethrough. The axially extending passageway 25 is generally circular and sized and shaped for closely receiving the rod bracket 30 therein by slip-fitted axial insertion. The first end portion 22 of the support member 20 further includes an anti-rotational end 26 extending outwardly from the first side 14 of the structural member 12 when the support member 20 is positioned therein. The passageway 25 of the anti-rotational end 26 has a noncircular anti-rotational opening 27 preferably being hexagonal-shaped and adapted to prevent rotation of the rod bracket 30 relative the support member 20, as described further hereinafter.

The support member 20 is substantially positioned within and extends through the apertures 19 of the structural member 12 and is rigidly connected to the structural member 12. The first end portion 22 and the second end portion 24 are each rigidly connected to the structural member 12 by welding or bonding to the first and second sides 14, 16, respectively. The first end portion 22 of the support member 20 also includes a radially outwardly projecting flange 28 which abuts the first side 14 of the structural member 12 to axially position the support member 20 within the structural member 12 and is preferably welded or bonded to the structural member 12 to rigidly mount the first end portion 22 to the structural member 12.

Referring to FIG. 2, the rigid rod bracket 30 is preferably formed from a single piece of metallic material. The rod bracket 30 is straight and continuously linearly extending in a generally horizontal direction beneath the vehicle. The rod bracket 30 includes a first portion 31 for insertion within the support member 20. The first portion 31 includes a threaded retaining end 32 extending out beyond the second side 16 for receiving a retaining fastener, such as a nut 33, thereon for securing the rod bracket 30 to the support member 20. The nut 33 retains the rod bracket 30 in the support member 20 and integrates the rod bracket 30 and the support member 20 for significantly increased stiffness and resonant vibrational frequencies at the vehicle attachment point over prior art hangers.

In addition, the first portion 31 of the rod bracket 30 includes an anti-rotational portion 34 opposite the threaded retaining end 32 and having a noncircular outer mating surface 35 which is complementary shaped, preferably hexagonal-shaped, for matably engaging with the hexagonal-shaped anti-rotational opening 27 of the passageway 25 to prevent rotation of the rod bracket 30 relative the support member 20. The anti-rotational portion 34 of the rod bracket 30 preferably has an axial length greater than an axial length of threads on the threaded retaining end 32 such that the nut 33 can be tightened during assembly onto the rod bracket 30 without the anti-rotational portion 34 popping out of the support member 20 and without the use of a "back-up" wrench.

A second portion 36 of the rod bracket 30 continuously linearly extends from the first portion 31 and extends outwardly from the first side 14 of the structural member 12 when the rod bracket 30 is inserted into the support member 20. A first annular collar 62 is at one end of the second portion 36 adjacent the anti-rotational portion 34 of the first portion 31 of the rod bracket 30. The first collar 62 has an outer circumference sized greater than the passageway 25 such that axial insertion of the rod bracket 30 within the support member 20 is limited by the first collar 62 to axially position the rod bracket 30 within the support member 20. The second portion 36 of the rod bracket 30 also includes a conical-shaped end 37 opposite the threaded retaining end 32 of the rod bracket 30. The remainder of the second portion 36 is a generally circular portion 38 extending between the conical-shaped end 37 and the first collar 62. In addition, a second annular collar 64 may also be included on the circular portion 38 to limit axial movement of the flexible element 40 when mounted on the rod bracket 30.

Referring to FIG. 1, the bent rod hanger member 50 is preferably made of metallic material and includes an upper end 52 and a lower end 54 having a hooked portion 56 adapted for supporting the exhaust pipe 60 therein. The flexible element 40 is preferably made of an elastomeric material and includes an upper hole 42 and a lower hole 44. The upper hole 42 is sized to receive the conical-shaped end 37 of the rod bracket 30 therethrough and the lower hole 44 is sized to receive the upper end 52 of the bent rod hanger member 50 therethrough.

The exhaust pipe hanger assembly 10 is assembled as follows. The apertures 19 are provided in the first and second sides 14, 16 of the structural member 12 and sized for closely receiving the tubular support member 20 therethrough. Next, the support member 20 is axially inserted into the structural member 12 until the flange 28 of the first end portion 22 of the support member 20 engages the first side 14 of the structural member 12 to limit axial insertion and the second end portion 24 of the support member 20 is seated within or extends slightly out through the second side 16 of the structural member 12. The first and second end portions 22, 24 of the support member 20 are each welded or bonded to the first and second sides 14, 16 of the structural member 12, respectively.

At this point, the conical-shaped end 37 of the rod bracket 30 is inserted into the upper hole 42 of the flexible element 40 in a first direction and the upper end 52 of the bent rod hanger member 50 is inserted into the lower hole 44 of the flexible element 40 from a second direction opposite the first direction.

During assembly to the vehicle, the first portion 31 of the rod bracket 30, with the threaded retaining end 32 leading, is axially inserted into the passageway 25 of the support member 20 and the hexagonal-shaped anti-rotational portion 34 of the rod bracket 30 is aligned to matably engage the hexagonal-shaped anti-rotational opening 27 of the passageway 25 until the first collar 62 engages the support member 20 to limit the axial insertion of the rod bracket 30 into the support member 20 and to axially position the rod bracket 30 relative the support member 20. When the first collar 62 engages the support member 20, the threaded retaining end 32 of the rod bracket 30 extends out through the second end portion 24 of the support member 20 and the second side 16 of the structural member 12. The nut 33 is then securely attached to the threaded retaining end 32 of the rod bracket 30 whereby the first portion 31 of the rod bracket 30 is securely captured within the support member 20 between the nut 33 and the first collar 62.

It will be appreciated that an anti-rotational feature of the exhaust hanger assembly is provided by the anti-rotational portion 34 of the rod bracket 30 and the complementary-shaped anti-rotational opening 27 of the passageway 25. It will further be appreciated that the anti-rotational portion 34 facilitates installation of the rod bracket 30 and reduces required labor by eliminating the need for a "back-up" wrench when securing the nut 33 to the rod bracket 30 as preferably enabled by the anti-rotational portion 34 having an axial length greater than the axial length of the threads of the threaded retaining end 32.

Advantageously, the entire assembly 10 only requires a single fastener 33 during the assembly which reduces assembly time and cost. It will also be appreciated that the continuously linearly extending rod bracket 30 is fabricated from a single straight metal rod and has no bends which provides for ease of manufacturing and also provides a more rigid rod bracket 30 than the typical bent rod brackets of the prior art.

In the assembled condition, it will be appreciated that the support member 20 is positioned substantially within and extends through the structural member 12 of the vehicle. In addition the rod bracket 30 is positioned within and extends through the support member 20 and structural member 12 of the vehicle. Thus, the combination of the support member 20 and the rod bracket 30 provide an extremely stiff, rigid attachment of the exhaust pipe hanger assembly 10 to the vehicle when compared to bolting an exhaust hanger component to the outside of the structural member 12 as in the prior art. Thus, the rod bracket 30 of the exhaust pipe hanger assembly 10 has significantly higher stiffness and resonant vibrational frequencies than conventional designs. Advantageously, this rigid attachment to the vehicle significantly reduces the transmission of structural noise and vibration into the vehicle. The resonant vibrational frequencies of the rod bracket 30 may be adjusted by varying the mass and length of the rod bracket 30.

It will be understood that a person skilled in the art may make modifications to the embodiments shown herein within the scope and intent of the claims.

For example, the conical-shaped end 37 of the rod bracket 30 may be a separate screw-on portion for easier assembly of the flexible element 40 onto the rod bracket 30. As another example, the length of the second portion 36 of the rod bracket 30 may be suitably varied depending on the desired position of the exhaust pipe 60 under the vehicle.

It will further be appreciated that the first annular collar 62 may be any enlarged cross-sectional shape sized greater than the passageway 25 to limit axial insertion of the rod bracket 30 into the support member 20. It will further be appreciated that the retaining means of the assembly 10 provided by the threaded retaining end 32 and nut 33 is merely exemplary and other retaining means may be used. For example, the retaining end 32 need not be threaded and may instead be deformable for retaining the rod bracket 30 in the support member 20. It is also contemplated that any combination of rods, clamps, straps, or flexible elements may be used to suspend the exhaust pipe 60 from the second portion 36 of the rod bracket 30 and the illustrated combination of the flexible element 40 and bent rod hanger member 50 adapted to hold the exhaust pipe 60 are merely exemplary.

Although the preferred embodiment shows a tubular support member 20 inserted through the structural member 12, it will be appreciated that the rod bracket 30 could be inserted directly through the structural member 12 or that the support member 20 could be formed as an integral part of the structural member 12.

It will further be appreciated that the anti-rotational means provided by the hexagonal-shaped anti-rotational portion 34 of the rod bracket 30 and the hexagonal-shaped anti-rotational opening 27 of the passageway 25 are merely exemplary and many mating shapes may be used for the passageway 25 of the support member and the outer mating surface 35 of the anti-rotational portion 34 of the rod bracket 30 as long as they matably engage to prevent rotation of the rod bracket 30 relative the support member 20.

Figure 3:
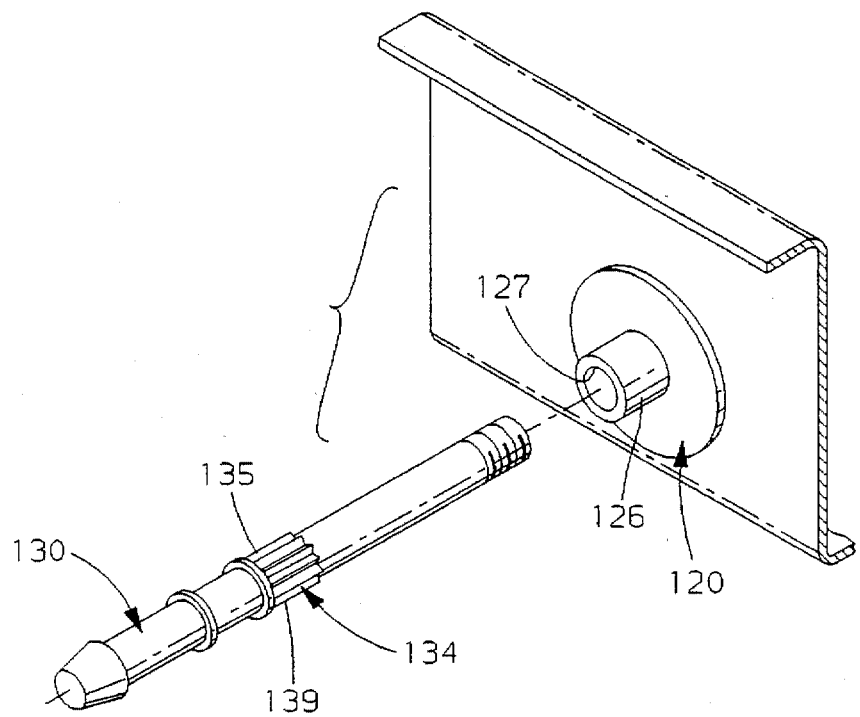
FIG. 3 shows a view similar to FIG. 2, but showing an alternate embodiment of the invention and partially-broken-away.

In another example, FIG. 3 shows a partially broken away view of a rod bracket 130 and support member 120 of an alternate embodiment similar to FIG. 2 except having an alternate anti-rotational means as described. An outer mating surface 135 of an anti-rotational portion 134 of the rod bracket 130 may include raised outwardly projecting axially extending serrations 139. An anti-rotational end 126 of the support member 120 has a circular anti-rotational opening 127 having a diameter sized for an interference fit with the outer mating surface 135 of the rod bracket 130. During assembly, the anti-rotational portion 134 of the rod bracket 130 is press-fitted within the anti-rotational end 126 of the support member 120 such that rotation of the rod bracket 130 relative the support member 120 is prevented.

It will further be appreciated that the rod bracket 130 may be directly welded to the support member 120 to provide yet another alternate anti-rotational means.

Figure 4:
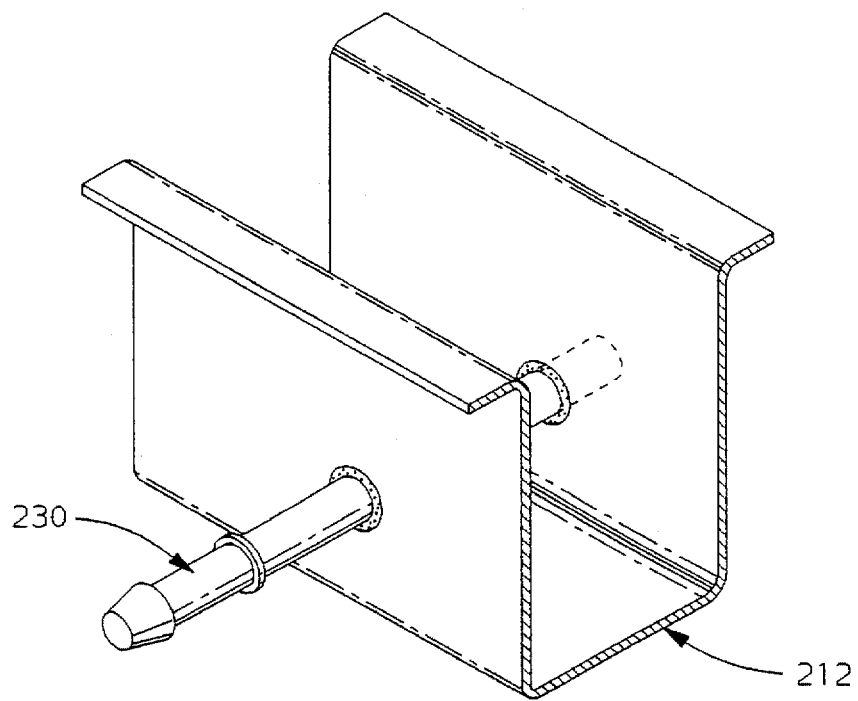
FIG. 4 shows a view similar to FIG. 2, but showing another alternate embodiment of the invention.

FIG. 4 shows another alternate embodiment of the invention, similar to the embodiment shown in FIGS. 1 and 2, but eliminating the support member 20. A rod bracket 230 is directly rigidly mounted, such as by welding, to a structural member 212 of a vehicle. Thus, the rod bracket 230 has high stiffness to reduce the transmission of exhaust pipe noise and vibration to the vehicle.

While the present invention has been described as carried out in a specific embodiment thereof, it is not intended to be limited thereby but is intended to cover the invention broadly within the scope and spirit of the appended claims.

The embodiments of the invention in which an exclusive property or privilege is claimed are defined as follows:

1. The combination of a channel-shaped vehicle frame rail and an assembly for suspending an exhaust pipe in a vehicle, the combination comprising:

said channel-shaped vehicle frame rail having first and second spaced apart opposing vertical sides;

a rigid, tubular support member extending between, directly engaging and rigidly secured to said first and second spaced apart opposing vertical sides of the channel-shaped vehicle frame rail, said rigid securement preventing movement of the rigid, tubular support member relative to the channel-shaped vehicle frame rail and the rigid, tubular support member having an inner passageway extending therethrough;

a continuously extending rigid, rod bracket having a first portion inserted in the passageway of the rigid, tubular support member and securely captured therein to prevent movement of the continuously extending rigid, rod bracket relative to the rigid, tubular support member, the continuously extending rigid, rod bracket directly engaging and securely connected to the rigid, tubular support member and being coaxial therewith, the continuously extending rigid, rod bracket having a second portion axially extending from and secured to the first portion and extending outwardly from the rigid, tubular support member; and suspension means attached to the second portion of the rigid, rod bracket for suspending the exhaust pipe therefrom;

whereby the continuously extending rigid, rod bracket which is captured in the rigid, tubular support member, in cooperation with the suspension means, reduces the transmission of exhaust pipe vibration into the vehicle.

2. The combination of claim 1 wherein the second portion of the continuously extending rigid, rod bracket includes means for limiting insertion of the continuously extending rigid, rod bracket within the passageway, the means for limiting being located directly adjacent the first portion of the continuously extending rigid, rod bracket and wherein the first portion has an end opposite the second portion, the opposite end including retaining means whereby the first portion of the continuously extending, rigid rod bracket is securely captured in the rigid, tubular support member by the means for limiting and the retaining means.

3. The combination of claim 2 wherein the means for limiting includes a radially outwardly projecting collar sized greater than the passageway.

4. An assembly for suspending an exhaust pipe in a vehicle, the assembly comprising:

a vehicle frame rail having first and second spaced apart opposing vertical sides;

a rigid support member extending between, directly engaging and rigidly secured to the first and second spaced apart opposing vertical sides of the vehicle frame rail to prevent movement of the support member relative to the vehicle frame rail, the support member having an inner passageway extending therethrough;

a continuously linearly extending rigid rod bracket having a first portion inserted in the passageway of the support member and securely captured therein to prevent movement of the rod bracket relative to the support member, the rod bracket directly engaging and securely connected to the rigid support member and being coaxial therewith, the rod bracket having a second portion linearly extending from the first portion and extending outwardly from the support member; and means for suspending the exhaust pipe from the second portion of the rod bracket, the means for suspending including a flexible element and a rod hanger member adapted to support the exhaust pipe, the flexible element having one end connected to the second portion of the rod bracket and another end connected to the rod hanger member;

whereby the rigid rod bracket captured in the rigid support member reduces the transmission of exhaust pipe vibration into the vehicle.

5. An assembly for suspending an exhaust pipe in a vehicle, the assembly comprising:

a vehicle frame rail having first and second spaced apart opposing vertical sides;

a rigid support member extending between, directly engaging and rigidly secured to the first and second spaced apart opposing vertical sides of the vehicle frame rail to prevent movement of the support member relative to the vehicle frame rail, the support member having an inner passageway extending therethrough;

a continuously linearly extending rigid rod bracket having a first portion inserted in the passageway of the support member and securely captured therein to prevent movement of the rod bracket relative to the support member, the rod bracket directly engaging and securely connected to the rigid support member and being coaxial therewith, the rod bracket having a second portion linearly extending from the first portion and extending outwardly from the support member;

means for suspending the exhaust pipe from the second portion of the rod bracket; and means for preventing rotation of the rod bracket relative to the support member;

whereby the rigid rod bracket captured in the rigid support member reduces the transmission of exhaust pipe vibration into the vehicle.

6. The assembly of claim 5 wherein the means for preventing rotation includes a noncircular outer perimeter on the first portion of the rod bracket and a complementary-shaped noncircular opening in the passageway of the support member, the noncircular outer perimeter and the noncircular opening matably engaging when the rod bracket is inserted into the support member to prevent rotation of the rod bracket relative the support member.

7. The assembly of claim 6 wherein the noncircular outer perimeter on the first portion is located adjacent the second portion and has a first axial length and wherein the first portion includes a threaded retaining end extending out beyond the support member and opposite the noncircular outer perimeter, the threaded retaining end including threads having a second axial length and wherein the first axial length is greater than the second axial length.

8. The assembly of claim 5 wherein the means for preventing rotation includes outwardly projecting portions on the first portion of the rod bracket being press-fittedly inserted into the passageway to prevent rotation of the rod bracket relative the support member.

9. An exhaust pipe hanger assembly for suspending an exhaust pipe in a vehicle, the assembly comprising:

a rigid vehicle flame rail having a first side and a spaced apart opposing second side;

a rigid tubular support member positioned substantially within and extending axially through the vehicle frame rail, the support member directly engaging and extending between the first and second sides of the vehicle frame rail, the support member having a first end portion rigidly secured to the first side of the vehicle frame rail and a second end portion rigidly secured to the second side of the vehicle frame rail, the support member having an axially extending passageway entirely therethrough;

a continuously linearly extending rigid rod bracket being an axially elongated rod having a first portion axially slip-fittedly inserted within the passageway of the support member and securely captured therein to prevent movement of the rod bracket relative the support member, the rod bracket directly engaging the support member and being coaxial therewith, the rod bracket having a second portion linearly extending from first portion of the rod bracket and extending outwardly from the first end portion of the tubular support member adjacent the first side of the vehicle frame rail; and means for suspending the exhaust pipe from the second portion of the rod bracket;

whereby the rigid rod bracket captured in the rigid support member reduces the transmission of exhaust pipe vibration into the vehicle.

10. The assembly of claim 9 wherein the first and second sides of the vehicle frame rail are vertically oriented and wherein the rod bracket is horizontally oriented.

11. The assembly of claim 9 wherein the second portion of the rod bracket includes means for limiting insertion of the rod bracket within the passageway, the means for limiting being located directly adjacent the first portion of the rod bracket and wherein the first portion has an end opposite the second portion, the end including retaining means whereby the first portion of the rod bracket is securely captured in the support member by the means for limiting and the retaining means.

12. The assembly of claim 9 wherein the means for suspending the exhaust pipe from the rod bracket includes a flexible element and a rod hanger member adapted to support the exhaust pipe, the flexible element having one end connected to the rod bracket and another end connected to the second portion of the rod hanger member.

13. The assembly of claim 9 further including means for preventing rotation of the rod bracket relative the support member.

14. The assembly of claim 13 wherein the means for preventing rotation includes a noncircular outer perimeter on the first portion of the rod bracket and a complementary-shaped noncircular opening in the passageway of the support member, the noncircular outer perimeter and the noncircular opening matably engaging when the rod bracket is slip-fittedly inserted into the support member to prevent rotation of the rod bracket relative the support member.

15. The assembly of claim 13 wherein the means for preventing rotation includes outwardly projecting portions on the first portion of the rod bracket being press-fittedly inserted into the passageway to prevent rotation of the rod bracket relative the support member.

16. The assembly of claim 9 wherein one of the end portions of the support member includes a radially outwardly projecting flange to limit insertion of the support member into the vehicle frame rail and to axially position the support member relative to the vehicle frame rail.

* * * * *